United States Patent
Zhang

(10) Patent No.: US 6,537,073 B2
(45) Date of Patent: Mar. 25, 2003

(54) COMPUTER-ASSISTED METHOD AND SYSTEM OF SPECIAL EDUCATION FOR INDIVIDUALS WITH LEARNING DIFFICULTY

(76) Inventor: Hanzhong Zhang, 66 Hilltop Rd., Millington, NJ (US) 07946

( * ) Notice: Subject to any disclaimer, the term of this patent is extended or adjusted under 35 U.S.C. 154(b) by 0 days.

(21) Appl. No.: 09/848,884

(22) Filed: May 4, 2001

(65) Prior Publication Data

US 2002/0058236 A1 May 16, 2002

Related U.S. Application Data

(60) Provisional application No. 60/201,774, filed on May 4, 2000.

(51) Int. Cl.[7] ............................................... G09B 19/00
(52) U.S. Cl. ...................................................... 434/236
(58) Field of Search ......................................... 434/236

(56) References Cited

U.S. PATENT DOCUMENTS 6,042,383 A * 3/2000 Herron ........................ 434/107
6,149,441 A * 11/2000 Pellegrino et al. .......... 434/118
6,225,920 B1 * 5/2001 Dayle ........................... 341/20
6,334,779 B1 * 1/2002 Siefert ......................... 434/322

* cited by examiner

Primary Examiner—Gene Mancene
Assistant Examiner—Hyder Ali
(74) Attorney, Agent, or Firm—George G. Wang

(57) ABSTRACT

A computer-assisted method of special education for individuals with learning difficulty. The method embodied in a computer software program has (i) a capability of using customized teaching materials prepared by an end-user educator who prepares a lesson for a particular student, (ii) a capability of allowing said end-user educator to dynamically setup each lesson session for a particular student with teaching materials either come built-in with the software or made by the educator, and (iii) a capability of training a student based on the discrete-trial methodology by presenting an arrangement of user interface items on the computer screen so that said student can interact with said items by using a computer mouse or a keyboard.

8 Claims, 10 Drawing Sheets

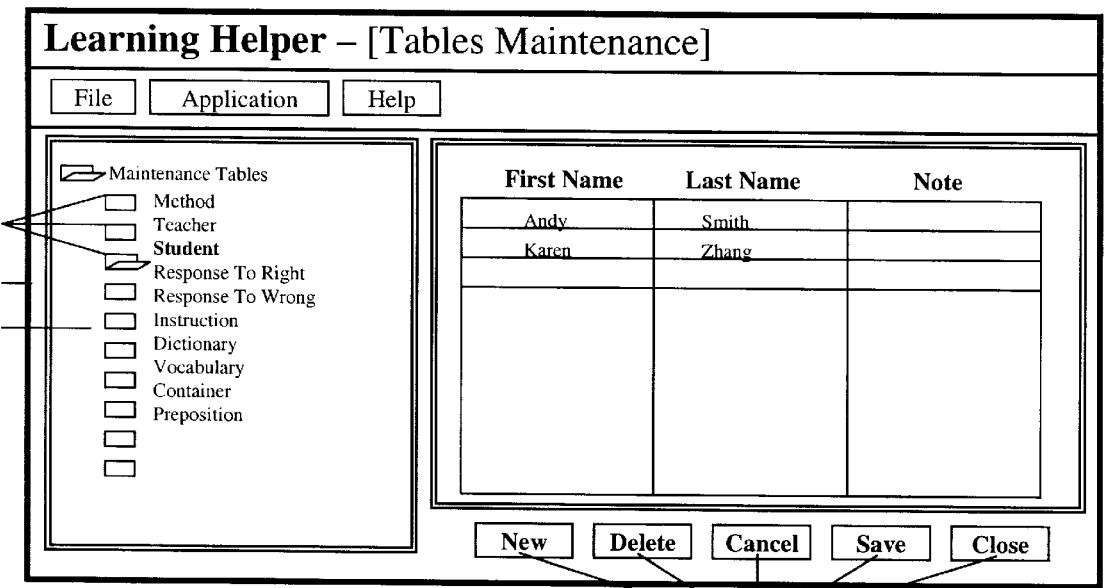

Fig. 5

Learning Helper – [Lesson Setup – Discrete-trial]

File | Application | Help

| Lesson | Student | Response-Right | Response-Wrong | Instruction |
|---|---|---|---|---|
| Balls | Smith, Andy | Yes, Good Job! | No, try again! | Click On |
| Body Part Recognition | Smith, Andy | Yes, Good Job! | No, try again it! | Click On |
| Color Recognition | Smith, Andy | Yes, you did it! | No, try again it! | Which Is |

- ☐ Color Differentiation
- ☞ Object Recognition
  - ☐ Household Objects
  - ☞ Body Parts
    - ☐ Index Finger
    - ☐ Middle Finger
    - ☐ Ring Finger
    - ☐ Small Finger
    - ☐ Thump
    - ☐
  - ☐ Fruits and Vegetables
- ☐ People Recognition
- ☐ Position Add Lesson | Delete Lesson

| Lesson Content | Total Tries | Total Correct Answers | Success Rate(%) | Last Updated On | Seq. |
|---|---|---|---|---|---|
| Index Finger | 34 | 26 | 76% | 9/26/99 | 1 |
| Thump | 34 | 26 | 76% | 9/26/99 | 2 |
| Ring Finger | 34 | 28 | 82% | 9/26/99 | 3 |
| Small Finger | 34 | 34 | 100% | 9/26/99 | 4 |
| Middle Finger | 34 | 30 | 88% | 9/26/99 | 5 |

Delete Lesson Content | Add To Vocabulary | Save | Close

Fig. 6

Learning Helper – [Lesson Setup – Comparison]

File | Application | Help

| Lesson | Student | Response-Right | Response-Wrong | Instruction |
|---|---|---|---|---|
| Comparison – Height (short) | Smith, Andy | Yes, Good Job! | No, try again! | Which Is |
| Comparison – Height (tall) | Smith, Andy | Yes, Good Job! | Smith, Andy | Which Is |
| Comparison – Number (less) | Smith, Andy | Yes, you did it! | No, try again it! | Which Is |

- ☞ Number
  - ☐ Counting Numbers
  - ☞ Counting With Finger
    - ☐ 1
    - ☐ 2
    - ☐ 3
    - ☐ 4
    - ☐ 5
    - ☐ 6
    - ☐ 7
    - ☐
  - ☐ Many vs. Fewer Add Lesson | Delete Lesson

| Lesson Content | Total Tries | Total Correct Answers | Success Rate(%) | Last Updated On | Seq. |
|---|---|---|---|---|---|
| One | 0 | 0 | 0% | | 1 |
| Three | 0 | 0 | 0% | | 2 |
| Two | 0 | 0 | 0% | | 3 |
| Four | 0 | 0 | 0% | | 4 |
| Five | 0 | 0 | 0% | | 5 |

Delete Lesson Content | Add To Vocabulary | Save | Close

Fig. 7

Learning Helper – [Lesson Setup –Drag-drop Counting]

File | Application | Help

| Lesson | Student | Response-Right | Response-Wrong | Instruction |
|---|---|---|---|---|
| Counting Numbers | Smith, Andy | Yes, Good Job! | No, try again! | Move |
| Counting Numbers 2 | Smith, Andy | Yes, Good Job! | No, try it again! | Move |

Number
– Counting N
  □ 1
  □ 2
  □ 3
  □ 4
  □ 5
  □ 6
  □ 7
  □

Add Lesson | Delete Lesson

| Lesson Content | Total Tries | Total Correct Answers | Success Rate(%) | Last Updated On | Seq. |
|---|---|---|---|---|---|
| One | 0 | 0 | 0% |  | 1 |
| Three | 0 | 0 | 0% |  | 2 |
| Two | 0 | 0 | 0% |  | 3 |
| Four | 0 | 0 | 0% |  | 4 |
| Five | 0 | 0 | 0% |  | 5 |

| Source | Bean |
|---|---|
| Family Rm. | Pumpkin |

Add | Delete

| Dest. | Target |
|---|---|
| Kitchen | □ |
| Living Rm | □ |

Add | Delete

Save | Close | Delete Lesson Content

Learning Helper – [Lesson Setup – Number-matching]

File | Application | Help

| Lesson | Student | Response-Right | Response-Wrong | Instruction |
|---|---|---|---|---|
| Counting Number Match(5- | Smith, Andy | Yes, Good Job! | No, try again! | How Many |
| Counting Number Match | Smith, Andy | Yes, Good Job! | Smith, Andy | How Many |

Number
  □ Counting Numbers
  – Counting With Finger
    □ 1
    □ 2
    □ 3
    □ 4
    □ 5
    □ 6
    □ 7
    □
  □ Many vs. Fewer Add Lesson | Delete Lesson

| Lesson Content | Total Tries | Total Correct Answers | Success Rate(%) | Last Updated On | Seq. |
|---|---|---|---|---|---|
| One | 0 | 0 | 0% |  | 1 |
| Three | 0 | 0 | 0% |  | 2 |
| Two | 0 | 0 | 0% |  | 3 |
| Four | 0 | 0 | 0% |  | 4 |
| Five | 0 | 0 | 0% |  | 5 |

Delete Lesson Content | Add To Vocabulary | Save | Close

Fig. 9

Learning Helper – [Lesson Setup –Multi-word Command]

| File | Application | Help |

| Lesson | Student | Response-Right | Response-Wrong | Instruction |
|---|---|---|---|---|
| Give food to people | Smith, Andy | Yes, Good Job! | No, try again! | Give |
| Move household objects | Smith, Andy | Yes, Good Job! | No, try it again! | Move |
| Move Kitchen/Laundry objects | Smith, Andy | Yes, Good Job! | No, try it again! | Move |

☐ Two Word Com     [Add Lesson]   [Delete Lesson]

| Lesson Content | Total Tries | Correct Answers | Total Success Rate(%) | Last Updated On | Seq. |
|---|---|---|---|---|---|
| Cookies | 0 | 0 | 0% | | 1 |
| Milk | 0 | 0 | 0% | | 2 |
| Orange | 0 | 0 | 0% | | 3 |
| Pumpkin | 0 | 0 | 0% | | 4 |
| Apple | 0 | 0 | 0% | | 5 |

| Source | Bean |
|---|---|
| Kitchen | |

[Add] [Delete]

| Dest. | Target |
|---|---|
| Kelvin Z | ☐ |
| Tiffany C | ☐ |

[Add] [Delete]

[Save]  [Close]  [Delete Lesson Content]

Fig. 10

Learning Helper – Text Timing

[Start Timing]  [Stop Timing]  [Test]     [Cancel]  [Done and Close]

Morning Activities: I wake up at seven o'clock in the morning. First I change my clothes. Then I go to the bathroom. I brush my teeth and wash my face. After that, I have my breakfast. At seven forty-five, I take a bus to school.

COMPUTER-ASSISTED METHOD AND SYSTEM OF SPECIAL EDUCATION FOR INDIVIDUALS WITH LEARNING DIFFICULTY

This application claims the benefit of U.S. Provisional Application No. 60/201,774, filed May 4, 2000.

BACKGROUND OF THE INVENTION

1. Field of the Invention

The present invention relates to a method and a tool for assisting and facilitating the learning process of learning-disabled individuals. More particularly, the present invention relates to a computer-assisted special educational method which can accommodate each individual learner's special need by allowing a dynamic setup of teaching material, such as its content and level of difficulty, by remembering each individual learner's learning skills and learning progress, and by providing rewards based on each individual learner's actual performance (in form of earned credits or tokens) with an adjustable rewording threshold to suit each learner current ability.

2. Description of the Related Art

With the advance in computer science and technology and the ever-increasing availability of computers in schools and households, computer-assisted learning methods have become well-known. Generally, those methods comprises two main components: hardware and software. Hardware basically includes a CPU, RAM, motherboard, keyboard, disk drives, monitor, and speakers, etc. Software, on the other hand, is intangible and comprises special instructions in form of sequences of "1" and "0", or binary codes. Software or more specifically, a collection of binary codes, is usually stored in a medium which allows access by hardware (such as by a disk drive) and is understandable by the CPU. The CPU processes the software binary code and perform the work instructed by the code, such as displaying a picture on the monitor or playing a sound in the speakers. The methods of developing software are also well known in the art.

Many educational software programs have been written and available in the market. To the applicant's knowledge, however, those programs generally lack the capability to (1) record information about the teacher and the leaner, vocal teaching commands, and vocal responses in the form of static tables, (2) allow each individual education (teachers, therapeutists or parents) to make or collect his or her own teaching materials, put them into the software program and use them as if they were built-in materials, (3) permit dynamic lesson setup so that each lesson can have different combination of teaching materials, built-in or freshly made by the educator, to suit each individual learner's actual needs, (4) permit customization of teaching parameters, such as instructions, commands and responses which can be in different voices. For example, the living book serial produced by Broderbund Software, Inc contains only static stories, that is, stories pre-created by the software providers. Those pre-created stories cannot be added, modified and reorganized.

Thus, one of the objects of the present invention is to overcome the static nature of conventional educational software and to provide a computer-assisted method that is dynamic and fully-customizable, suitable for children and particularly for those with learning difficulties, such as individuals with autism.

SUMMARY OF THE INVENTION

This and other objects are attained by the practice of the present invention, which provides a computer-assisted method of learning having the following features: (1) discrete-trial methodology, (2) text/voice/picture/video based instructions and teaching materials, (3) database supported management system, (4) fully customizable lesson setups, (5) automatic progress monitoring and reporting, and (6) comprehensive reward system. The method is suitable for school and home.

Teaching Material

According to one feature of the present invention, teaching materials can be created by educators themselves and put into the teaching system as if they were built-in materials from the software provider. This permits a dynamic, fully-customizable teaching material setup by blending built-in materials with educator's own teaching materials.

Lesson Parameters

Another aspect of customization of the teaching methods of the present invention is that the lesson parameters, such as instructions, commands and responses, are also changeable so that if a student prefer his or her mother's voice, or a particular friend's voice, or a particular pet's voice the method can provide the aforementioned lesson parameters in one or more of those particular voices to stimulate the student's learning process.

Lesson Setup

The method of the present invention provides a mechanism of setting up each lesson for each student according to the student's particular learning situation. There can be many lessons types, such as object identification, concept, multi-word command, math, and reading, etc. Custom-setup by an educator can be easily achieved through combination of different lesson types, lesson parameters and, most importantly, variety of teaching materials.

Lesson Playing

In the present invention, a learner working on a lesson is called playing a lesson because it is an interactive process, involving interaction with familiar voices (that can be setup as the mother's, father's or even a favorite dog's, pre-recorded and input into the learning system). The playing is based on the discrete-trial methodology, which includes four major steps: (a) item presentation, (b) instruction, (c) response, and (d) consequences. Each lesson can be played one at a time, or can be played in automatic mode, where pre-setup lessons can be played sequentially without teacher's intervention.

Reward System

The present invention provides a reward system. When it is turned on, a student can earn credits on the money board during a lesson playing. A reward (such as showing a movie) will be awarded when a predetermined credit requirement is met. The reward system is programmable such that the parameters in the reward system, credit requirement, the type of reward, can be setup by an educator. Therefore, when the playing in the automatic mode and the reward system is on, the computer becomes virtually a playing/learning station.

Program Report

The computer-assisted learning method of the present invention collects progress data automatically. Progress reports can be generated and printed periodically per lesson, per lesson type, per student, per class, and per school.

The various features of novelty which characterize the invention are pointed out with particularity in the claims annexed to and forming a part of the disclosure. For a better understanding of the invention, its operating advantages, and specific objects attained by its use, reference should be made to the drawing and descriptive matter in which there are illustrated and to described preferred embodiments of the invention.

BRIEF DESCRIPTION OF THE DRAWINGS

In the drawings, like reference characters denote similar elements throughout the several views:

FIG. 3 shows the static table maintenance screen of the same embodiment as outlined in FIG. 1.

FIG. 4 shows the teaching material setup screen of the same embodiment as outlined in FIG. 1.

FIG. 5 shows the discrete-trial lesson setup screen of the same embodiment as outlined in FIG. 1.

FIG. 6 shows the comparison lesson setup screen of the same embodiment as outlined in FIG. 1.

FIG. 7 shows the drag-drop counting lesson setup screen of the same embodiment as outlined in FIG. 1.

FIG. 8 shows the number-matching counting lesson setup screen of the same embodiment as outlined in FIG. 1.

FIG. 9 shows the multi-word command lesson setup screen of the same embodiment as outlined in FIG. 1.

FIG. 10 shows the text-reading timing setup screen of the same embodiment as outlined in FIG. 1.

DETAILED DESCRIPTION OF THE PRESENTLY PREFERRED EMBODIMENTS

Figure 1:
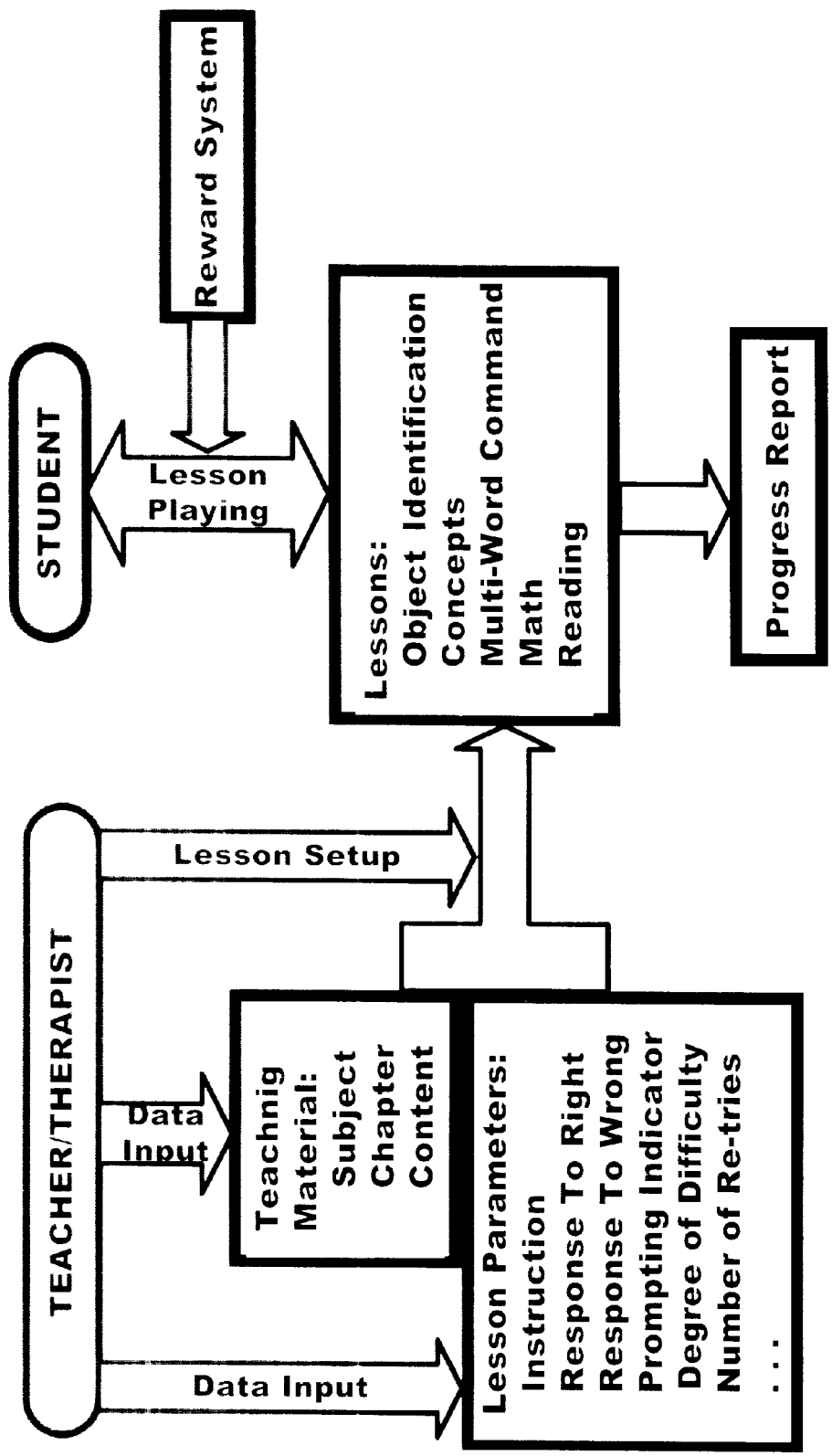
FIG. 1 represents a general software structure of one embodiment of the present invention.

A preferred embodiment of the present invention, referred as Learning Helper (hereinafter "Helper"), are outlined in FIG. 1.

Helper is client-server database-based application software written with Power Building (a C++ programming tool). Of course, it is not necessary to use the client-server architecture and any other programming tools can be used, such as Visual Basic, C++, Java, Delphi, etc. Any database management system can be used, such as SQL anywhere, Sybase, SQL sever, or Oracle. Software programming is conventional and not part of the present invention. Or in other words, the present invention is not limited to the specific software implementation. People skilled in the art can choose whatever tools, moods or architectures, as they prefer, to practice the present invention. It is entirely possible the present invention can be implemented without using a database system as it is understood today, any other effective information storing and retrieving mechanism, exiting now or to be developed in the future, can be used.

Database Server

In Helper, there are four types of database tables: static tables, material tables, lesson tables, and system tables. Their usages are listed in the following:

| Table Type | Table Name | Definition |
| --- | --- | --- |
| Static table | Teacher | Store teacher's name |
| | Student | Store student's name |
| | Response_to_right | Store the name of a sound file to be played as a response to a correct answer |
| | Response_to_wrong | Store the name of a sound file to be played as a response to a wrong answer |
| | Method | Store the type of training method |
| | Instruction | Store the name of a sound files to be played as lesson instructions |
| | Preposition | Store all preposition used in lessons |
| | Container | Store graphic files of the container (containing objects) |
| | Dictionary | Dictionary of sound and graphs |
| | Vocabulary | Store vocabulary for each students in the system |
| Material table | Subject | Store all subjects in the system |
| | Chapter | Store chapters of each subject |
| | Content | Store contents of each chapter |
| Lesson table | Lesson | Store lessons created in the system |
| | Lesson_content | Store contents used in each lesson |
| | Lesson_container | Store container used in each lesson |

Front End Application or Client

Figure 2A:
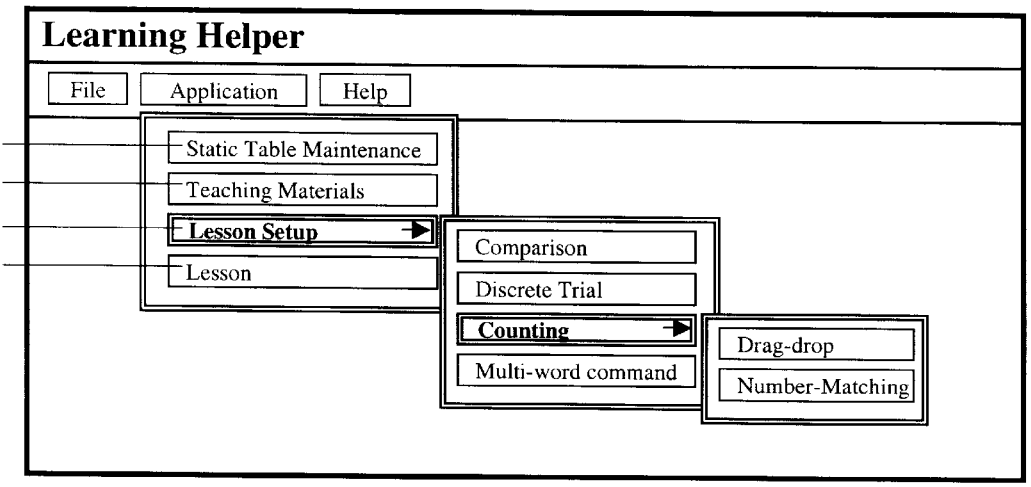
FIG. 2a shows all the lesson setup menu items of the same embodiment as outlined in FIG. 1
Figure 2B:
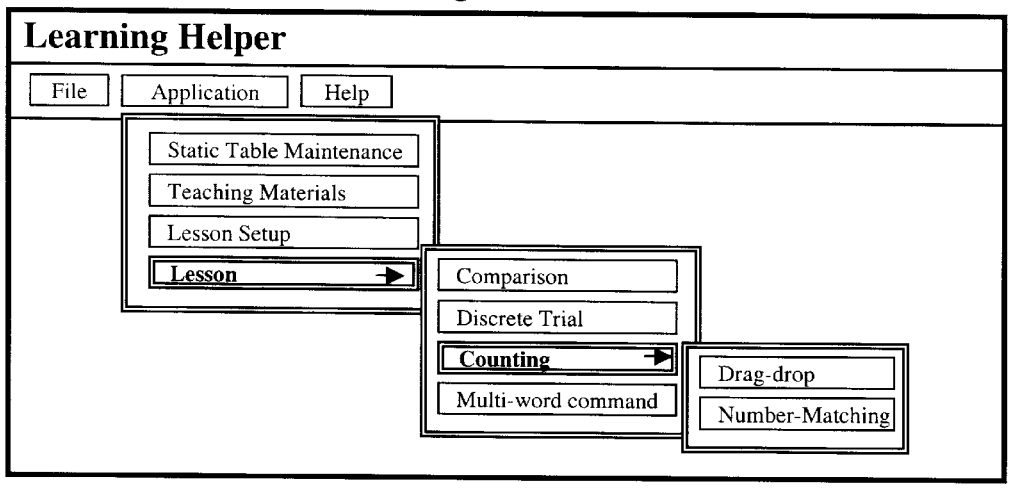
FIG. 2b shows all the lesson type menu items of the same embodiment as outlined in FIG. 1

With reference to FIG. 2, the front end of Helper includes four modules: static table maintenance 10, teaching material collection 20, lesson setup 30, and training lesson session 40.

Static Table Maintenance Module

Shown in FIG. 3, this module includes a window or a screen 50, containing a control treeview 60, several control buttons 70, and a number of datawindow objects 80. corresponding to the same number of static tables used in the system. Datawindow object is defined as a PowerBuilder object to link data between database and front-end application. A static table is selected for updating using treeview control 60. Control buttons 70 (New, Delete, Cancel, Save and Close) are used to execute the corresponding commands. Treeview control 60 manages static table entries while datawindow objects (invisible) updates the static tables. All treeview entries, each linked to one static table, are retrieved from the module table. To add a static table in the static table maintenance screen 50, one needs only to create a datawindow object for the new static table and then add the datawindow object to the module table. Therefore, it is easy to add new static tables into the module.

Teaching Material Collection Model

As shown in FIG. 4, this module has one screen 90 containing three sections, 100, 110, 120, for updating three material tables: subject 100, chapter 110 and content 120. There are four material types, reading, discrete-trial, quantity, and multi-word command. Each type of material used for the corresponding lesson setup except for the quantity type, which is used for both counting lesson and comparison lesson. In subject section 100, there are two other fields for specifying the teacher and student. In chapter section 110, there can be four fields, referred as Chapter, Details, Picture and Sound. The Detail field can store up to 30,000 characters, which can be edited either directly in the field or in a separate screen that can be brought up by double-clicking on the field. The picture and sound fields are used for selecting picture and sound files using the drop-down lists of the corresponding fields. Content section 120 in FIG. 4 shows four fields: Content, Detail, Picture and Sound. For a Reading Lesson there is an additional fields: Sound Time. Other setups can also be conduction in screen 90. For example, In a Reading Lesson, a text time screen shown in FIG. 10 may be brought up by clicking a menu item or a control button in screen 90, and any necessary setups can be done therein.

Lesson Setup Module

This module allows each lesson session to be customized. In this particular embodiment, Helper provides five lesson setup screens for: Discrete-trial lesson (FIG. 5), Comparison lesson (FIG. 6), Drag-drop counting lesson (FIG. 7), Number matching counting lesson (FIG. 8) and Multi-word command lesson (FIG. 9). All those lesson setup screens share many common features, comprising for example three sections (a treeview control 130, a lesson datawindow 140 and a lesson content datawindow 150). Of course, those lesson setup screens can be configured with fewer or more sections as desired. Lesson datawindow in this embodiment contains several fields: lesson name, student name, teacher name, response to right, response to wrong and instruction. Except for lesson name, all other fields therein have drop-down lists to retrieve the corresponding data from the static tables. A lesson needs to be created and saved before lesson contents can be added to it. Lesson contents are selected from items in treeview control 130. Data in treeview items are populated from the teaching material of the corresponding material type. In addition to the field name, lesson content also has fields for total tries, total correctness, successful rate, data updating date, and sequence number. Successful rate is an indicator of the particular student's performance on this particular content item. All the static data of a lesson for a particular student are collected during the lesson training session as discussed below. The sequence or "Seq." field is used to specify the order of content items to be presented during the training session.

In Discrete-trial lesson setup of Helper, the mastered words (i.e., with a high successful rate) can be added to the vocabulary pool of the trained student by clicking on the Vocabulary button (FIG. 5).

Lesson Training Session Module

Figure 11:
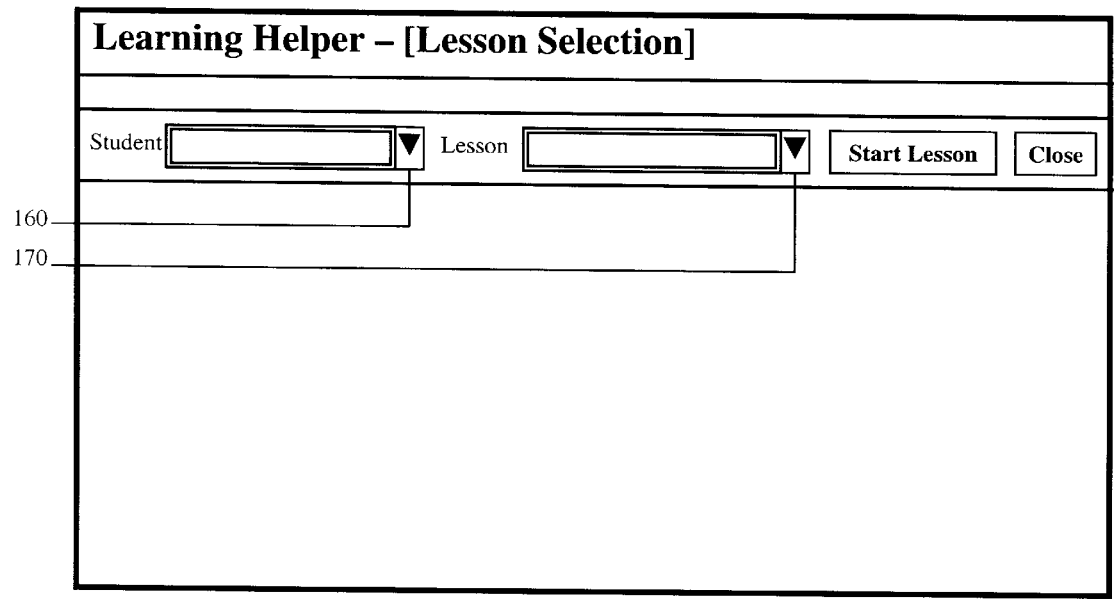
FIG. 11 shows the lesson training session screen of the same embodiment as outlined in FIG. 1.

This module in Helper is where actual learning takes place. As aforementioned, Helper provides five different types of lesson: discrete-trial, drag-drop counting, number-matching, multi-word command and reading. Of course, people skilled in this art can add more types of lessons. Except for the reading lesson, all lessons have a student section drop-down list 160 and a lesson selection drop-down list 170, FIG. 11.

Discrete-trial Lesson

Figure 12:
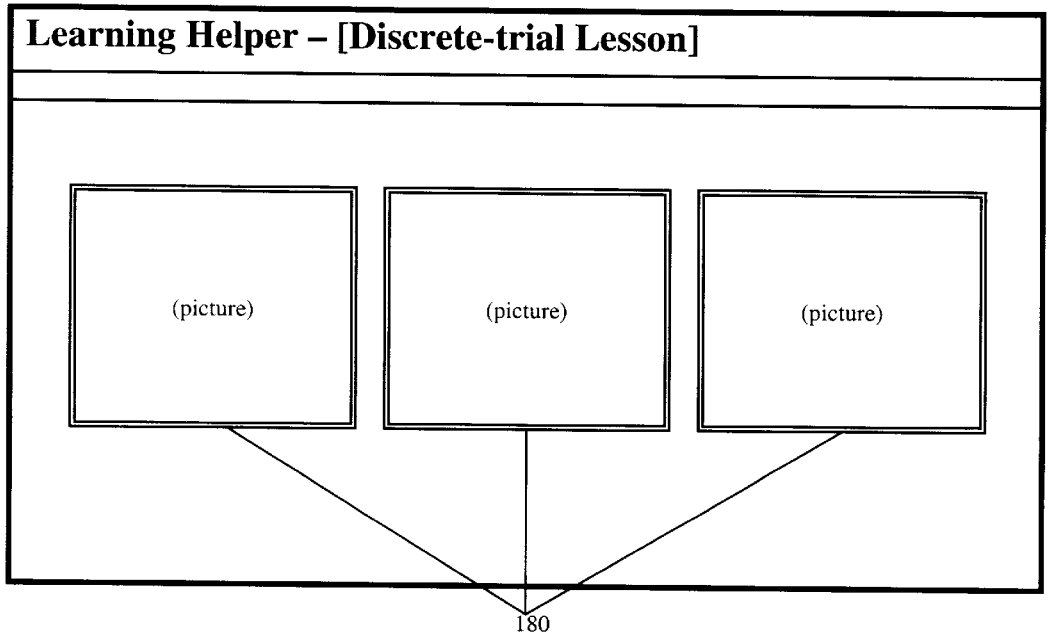
FIG. 12 shows the training session screen of a discrete-trial lesson in the same embodiment as outlined in FIG. 1.

A discrete-trial lesson in Helper comprises four steps: (1) presenting selection card—present, (2) issuing an instruction—command, (3) making a selection—response and (4) responding to the selection—consequence. When a discrete-trial lesson starts, it first presents two selection cards 180 for the student to choose from and then it is followed by a verbal command. The student is asked to make a selection (by clicking on one of the presented cards). Depending on which card is being clicked on, Helper responds either with an applaud sound (for a correct selection) or a warning sound (for a wrong selection). If a wrong selection is made, Helper may allow the student to make another selection. The number of reselections can be pre-setup in the lesson setup screen. Upon making a correct selection or reaching the allowed number of trials, Helper automatically replaces the earliest card of the two present cards with a new card. Then, with the new pair of cards, the student should continue with another cycle of the discrete-trial process. The discrete-trial lesson session continues until either all the elements in the list have been presented or an interrupt command is issued (for example, by pressing the key combination of "Control-C"). The contents in a list to be present in a trial session are retrieved from Helper's database. Selection cards presented can be picture, text, or both as may be defined in lesson setup. Of course, more than two cards can be presented for selection at the same time (three cards shown in FIG. 12. The order of cards to be presented may be in a specified sequence or randomized by Helper. Those implementations are within ordinary skill of a person in the art.

Comparison Lesson

Figure 13:
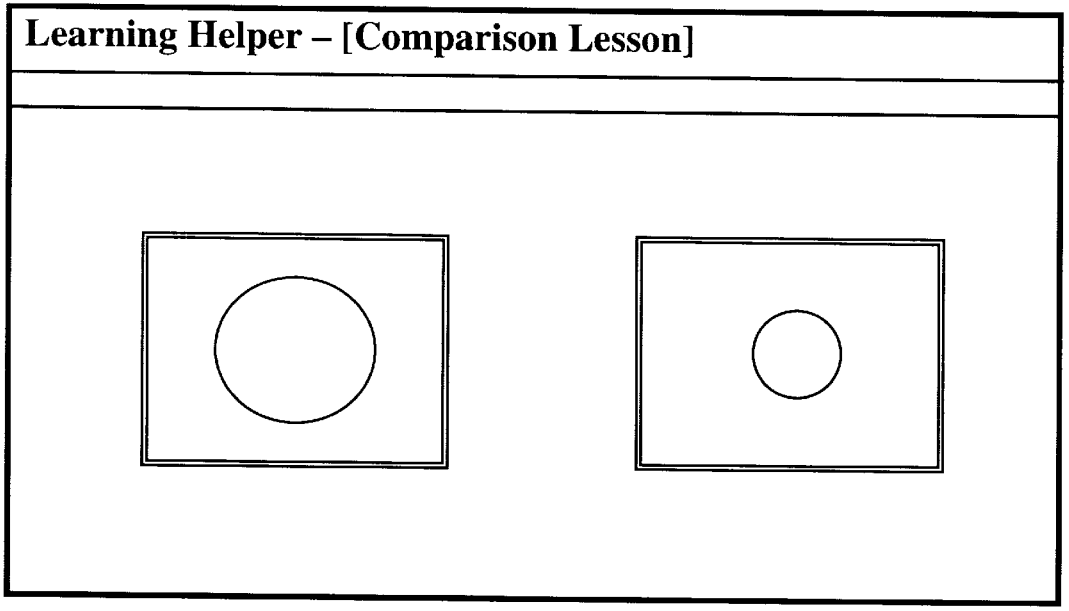
FIG. 13 shows the training session screen of a comparison lesson in the same embodiment as outlined in FIG. 1.

Comparison lesson is a special type of discrete-trial process for developing the concept of relativity, FIG. 13. Therefore, it comprises the same four steps discussed in the previous section. In the previous section, the discrete-trial process can be generally applied to any objects. On the other hand, the discrete-trial process is specifically directed to the comparison objects only. Helper provides nine comparison subtypes: more, fewer, more v. fewer, big, small, big v. small, tall, short, and tall v. short. Of course, more subtypes can be added as desired. Different subtypes use different instructions. For example, in the "more" subtype the instruction is "which is more," while in the "fewer" subtype the instruction is "which is fewer." In the "more v. fewer" subtype, there are two alternate instructions: "which is more" and "which is fewer." Count, size and height of objects presented in a comparison lesson can be specified by the lesson setup screen.

Drag-drop Counting Lesson

Figure 14:
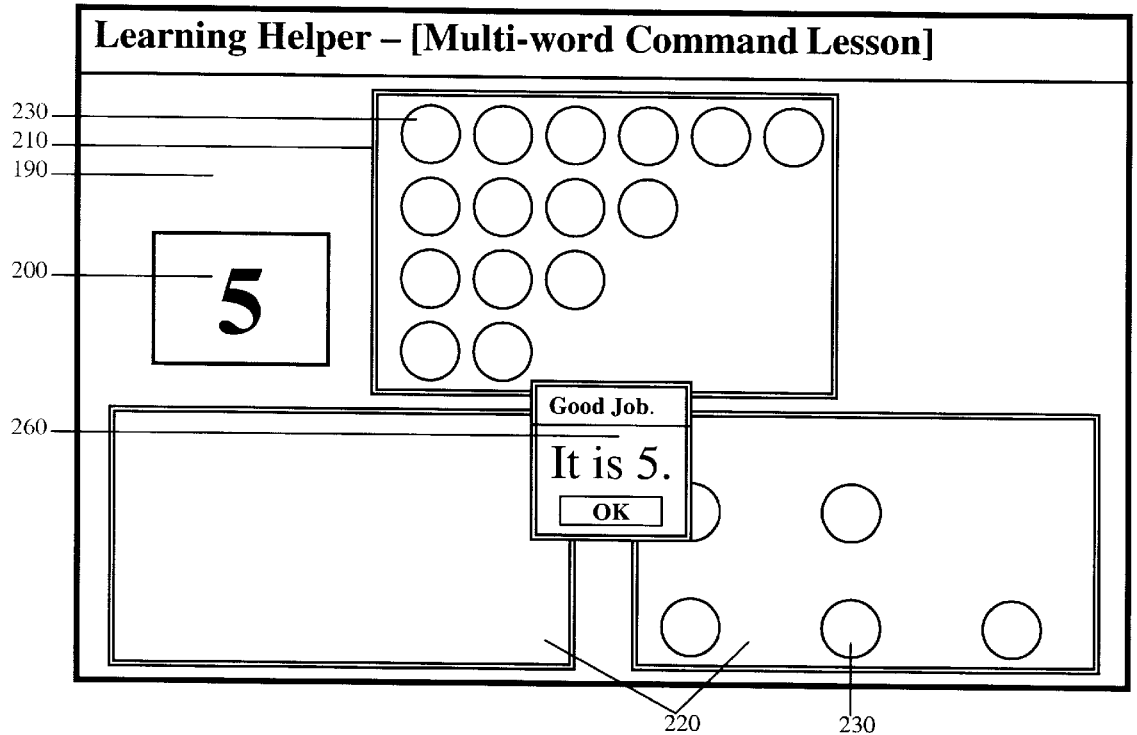
FIG. 14 shows the training session screen of a drag-drop lesson in the same embodiment as outlined in FIG. 1.

Drag-drop counting lesson is aimed at developing the concept of a number or quantity, FIG. 14. A screen 190 of this lesson contains a list of counts 200, a source container 210, one or more destination container 220, and a counting object 230. When the lesson begins, the student is asked to move (drag) a specified number of counting objects 230 from the source container 210 to one of the destination container 220. Helper ensures that only one counting object can be dragged at a time. When the number of the counting objects moved equals to the number asked, Helper shows a pop-up window 240 which shows the correct count and an encouragement message, moves back all the counting objects to the source container 210, and set the system ready for another round of drag-drop counting cycle.

Number-matching Counting Lesson

Figure 15:
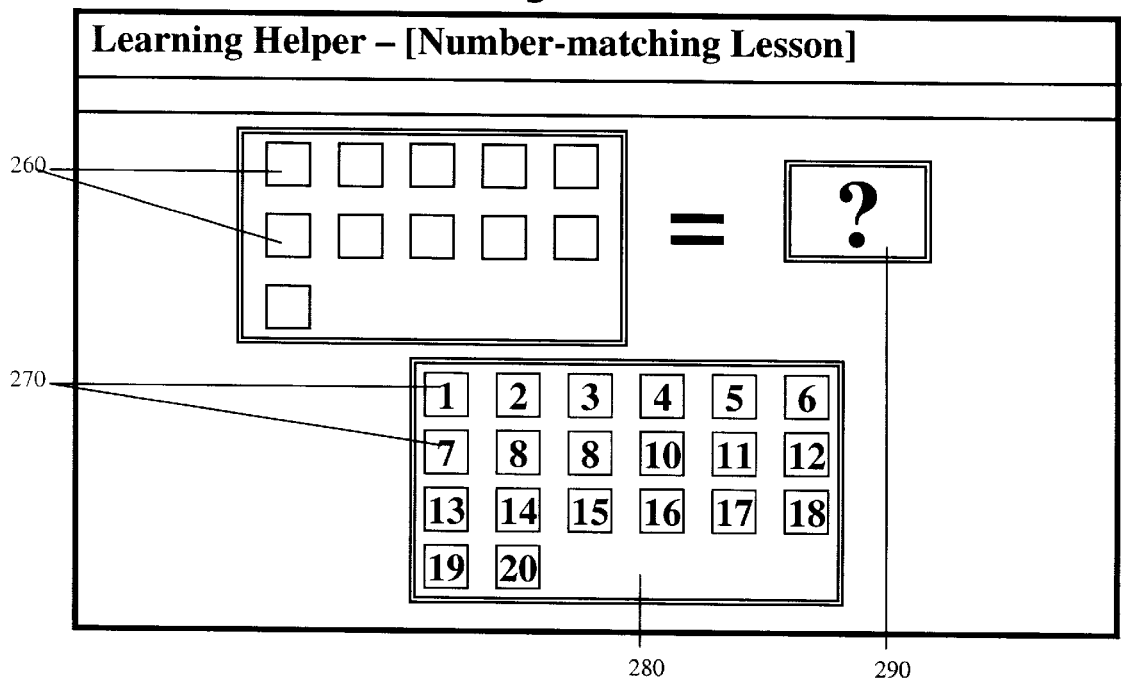
FIG. 15 shows the training session screen of a number-matching counting lesson in the same embodiment as outlined in FIG. 1.

In this lesson, FIG. 15, Helper presents a number of counting objects 260, and let student answer how many counting objects are presented. To answer, the student needs to drag a number token 270 from number pool 280 to question mark box 290. If the student dragged the token indicating the current number of counting object presented, Helper responds with an encouragement message. Otherwise, the student is asked to count again until making the correct answer or reaching the maximum number of allowed trials. Helper then continues for another number-matching counting cycle. The total cycles in a lesson can be specified and, of course, the process can be interrupted by pressing "Control-C".

Multi-command Lesson

Figure 16:
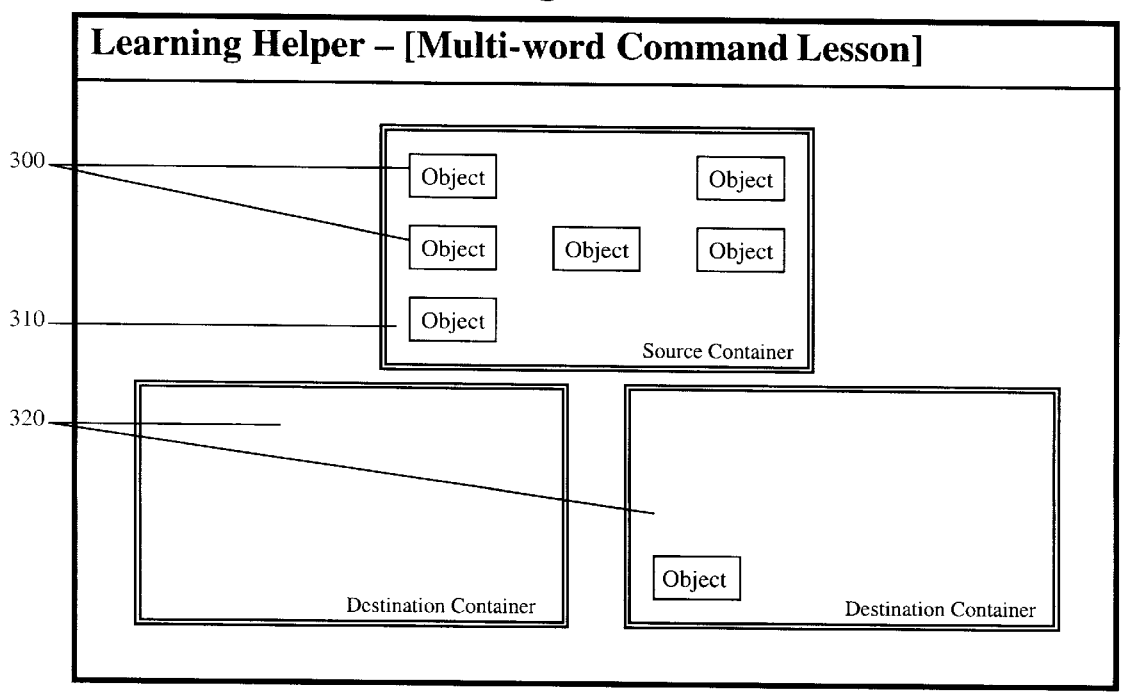
FIG. 16 shows the training session screen of a multi-word command lesson in the same embodiment as outlined in FIG. 1.

Although similar to the number-matching counting lesson, multi-command lesson, FIG. 16, is directed to understanding objects (things), rather than counts. The objects 300 are presented in a source container 310, and Helper asks the student to act (move, give, take) on one object at a time from the source container 310 to one of the destination containers 320. Depending on whether the student correctly follows the command, Helper will provide a response (or feedback) as in other lesson types.

Reading Lesson

Figure 17:
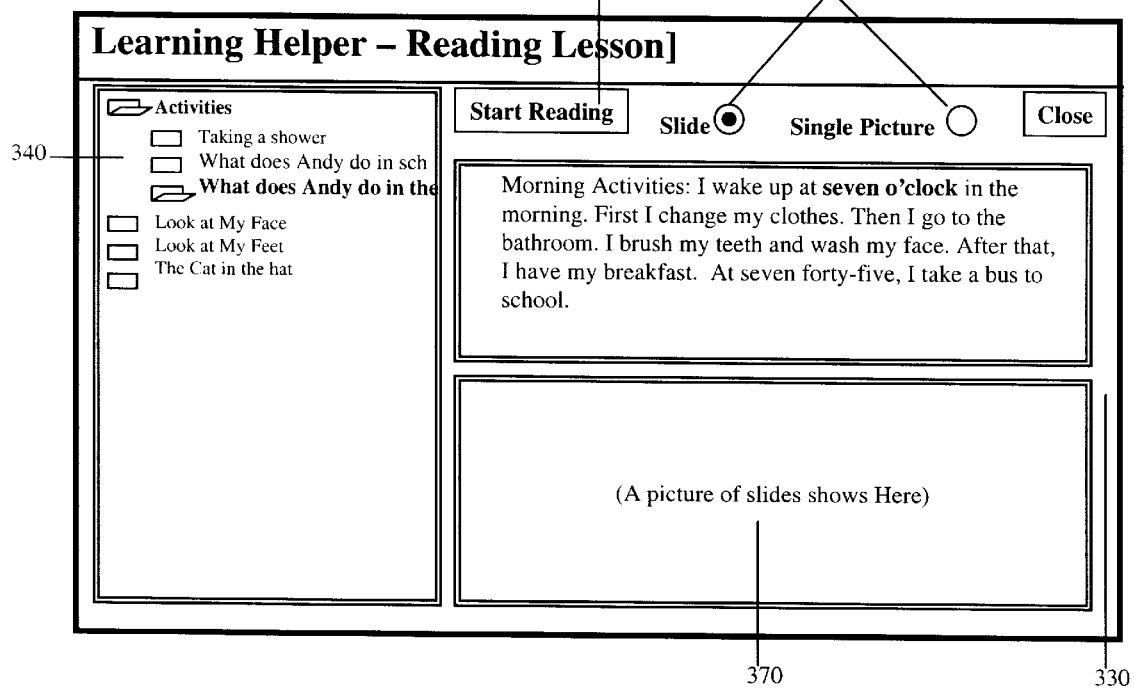
FIG. 17 shows the training session screen of a reading lesson in slide-show mode in the same embodiment as outlined in FIG. 1.
Figure 18:
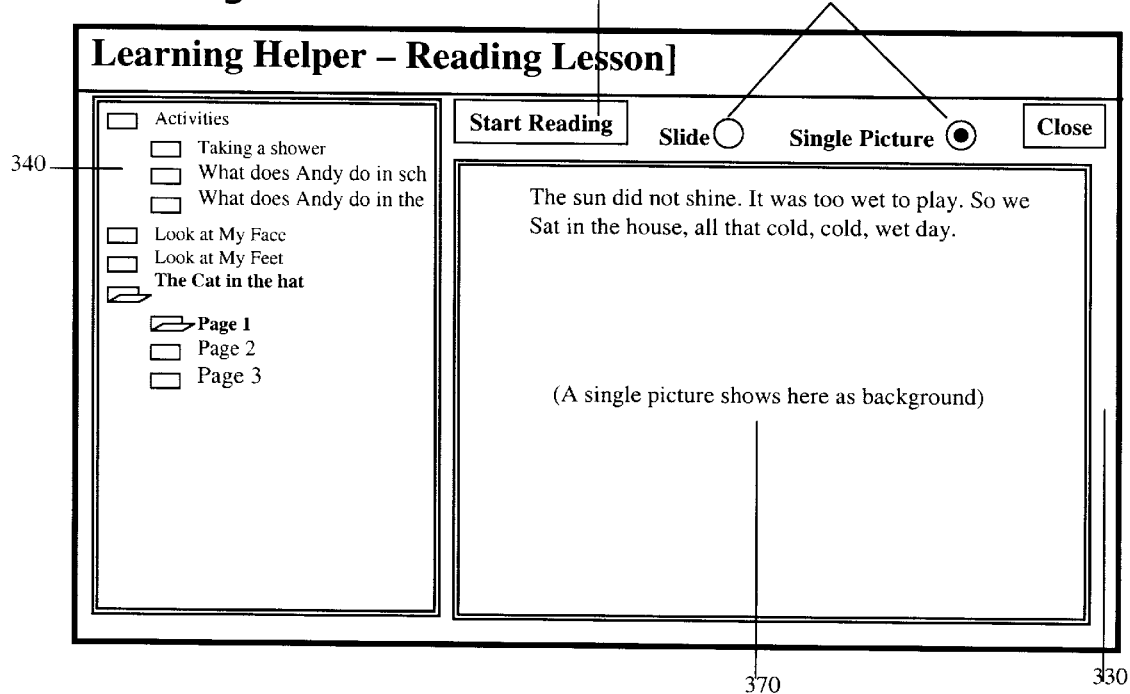
FIG. 18 shows the training session screen of a reading lesson in single-picture mode in the same embodiment as outlined in FIG. 1.

As shown in FIGS. 17 and 18, a reading lesson is different from other lessons in Helper in that it does not have the student and teacher attributes. It is a generic lesson in the system. Reading lessons are setup in the material collection screen. Reading lesson screen 330 includes a treeview control 340 for content selection, a lesson starting button 350, a picture mode selection buttons 360, and a picture display area 370. When a reading lesson session starts, Helper retrieves all reading lessons (reading materials) from the database and lists them in the treeview control 340 for easy selection. There are two presentation modes, single picture mode (shown in FIG. 18) and slide show mode (shown in FIG. 17). In single picture mode, each picture is a page and the accompanying text is printed on the picture. There is no picture change while the text is read. In slide show mode, however, the picture and text are presented in different sections. When the text is read, words are highlighted in sync with the reading sound and a picture associated with the highlighted word or sentence is displayed as in a slide show.

User Interface Implementation

The above-described modules are implemented by conventional programming methods. Helper itself is implemented using PowerBuilder, although other tools can also be satisfactorily used, such as Visual Basic, Visual C++, Delphi, etc. The graphic user interfaces (GUIs), such as menu items, control buttons, list boxes, etc, are standardized in many operating systems, such as MS Windows, Mac OS, X Windows. Their implementation, known to people skilled in the art, forms no part of the present invention, which is not limited to any specific implementations of those GUIs.

While there have been described and pointed out fundamental novel features of the invention as applied to a preferred embodiment thereof, it will be understood that various omissions and substitutions and changes in the form and details of the embodiment illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

The invention is not limited by the embodiments described above which are presented as examples only but can be modified in various ways within the scope of protection defined by the appended patent claims.

I claim:

1. A method of developing an educational computer software for assisting students with learning difficulties, comprising the steps of (a) providing said software with a capability of taking and using customized teaching materials prepared by an end-user educator who prepares a lesson for said students;

(b) providing said software with a capability of allowing said end-user educator to dynamically setup each lesson session for a particular student with teaching materials either come built-in with the software or made by said educator as described in step (a), and (c) providing said software with a capability of interacting with said student in a discrete-trial learning lesson by (i) presenting to said student a learning material, either a concept or an object, (ii) issuing an instruction or command, (iii) allowing said student making a response to said instruction or command, and (iv) determining whether said response made by said student is correct and providing a visual or audio message to said student, said discrete-trial learning lesson being configurable by said educator according to the capability provided by step (b).

2. The method of claim 1, further comprising step (d) of providing said software with a capability of presenting an arrangement of user interface items so that said student can interact with said items by using a computer mouse or a keyboard.

3. The method of claim 2, wherein said discrete-trial learning lessons are of predetermined several types.

4. The method of claim 3, where said predetermined types of discrete-trial learning lessons are generic discrete-trial lesson, comparison lesson, drag-drop counting lesson, number-matching lesson and multi-word command lesson.

5. The method of claim 1, further comprising step (e) of providing said software with a capacity of automatically recording progress data for a particular student, indicating how well said student has progressed in using said software.

6. The method of claim 1, further comprising step (f) of providing said software with a capacity of providing a reward for a student whose performance with said software has reached a predetermined level.

7. A computer-assisted educational method, comprising the step of (a) installing a software program developed using the method of claim 1 in a computer system having a monitor, a mouse, a microphone, a speak and a keyboard;

(b) loading said software program in said computer system;

(c) starting a lesson session by issuing a command to said software program which presents an arrangement of a number of graphic user interface (GUI) items;

(d) having a student interact with said GUI items through pressing a key on the keyboard, clicking on the mouse or speaking to the microphone.

8. An educational device for a student with learning difficulties, comprising a computer hardware system and a computer software program, said hardware system comprising a system memory chip and a persistent code storage medium, and said software program being a collection of digital codes, being developed using the method of claim 1, being stored in said persistent storage medium, and being transferred from said persistent storage medium to said system memory chip wherein it performs one of more intended actions.

* * * * *